(12) United States Patent
Bhaskar et al.

(10) Patent No.: US 11,334,511 B2
(45) Date of Patent: May 17, 2022

(54) SYSTEM, APPARATUS AND METHOD FOR PEER-TO-PEER COMMUNICATION ON A MULTI-DROP INTERCONNECT

(71) Applicant: Intel Corporation, Santa Clara, CA (US)

(72) Inventors: Rajesh Bhaskar, Kaggadasapura (IN); Enrico Carrieri, Placerville, CA (US); Kenneth Foust, Beaverton, OR (US); Janusz Jurski, Beaverton, OR (US); Myron Loewen, Berthoud, CO (US); Matthew A. Schnoor, Hillsboro, OR (US); Amit Kumar Srivastava, Folsom, CA (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/655,511

(22) Filed: Oct. 17, 2019

(65) Prior Publication Data
US 2020/0050571 A1  Feb. 13, 2020

(51) Int. Cl.
*G06F 1/10* (2006.01)
*H04L 67/104* (2022.01)
*G06F 13/40* (2006.01)
*H04L 12/40* (2006.01)
*H04L 12/18* (2006.01)
*H04L 29/06* (2006.01)

(52) U.S. Cl.
CPC ............ *G06F 13/4027* (2013.01); *G06F 1/10* (2013.01); *H04L 12/18* (2013.01); *H04L 12/40019* (2013.01); *H04L 67/104* (2013.01); *H04L 63/10* (2013.01)

(58) Field of Classification Search
CPC ....... G06F 13/4027; G06F 1/10; H04L 12/18; H04L 12/40019; H04L 67/104; H04L 63/10
See application file for complete search history.

(56) References Cited

U.S. PATENT DOCUMENTS

| | | |
|---|---|---|
| 2010/0169523 A1 | 7/2010 | Dunstan et al. |
| 2013/0335151 A1 | 12/2013 | Schrom et al. |
| 2014/0016679 A1 | 1/2014 | Kesling et al. |
| 2014/0229644 A1 | 8/2014 | Thanigasalam et al. |

(Continued)

OTHER PUBLICATIONS

MIPI Alliance, "Specification Brief, Audio & Control: SLIMbus®, SoundWireSM," Oct. 7, 2014, 1 page.

(Continued)

*Primary Examiner* — Henry Tsai
*Assistant Examiner* — Harry Z Wang
(74) *Attorney, Agent, or Firm* — Trop, Pruner & Hu, P.C.

(57) ABSTRACT

In one embodiment, an apparatus includes: a peer-to-peer (P2P) control circuit to issue a P2P communication request to a bus master of a multi-drop interconnect to request authorization to send a P2P transaction to at least one slave device coupled to the multi-drop interconnect; a transmitter to transmit the P2P transaction to the at least one slave device when the bus master grants the authorization for the P2P transaction; and another transmitter to output the clock signal to the multi-drop interconnect during the P2P transaction. Other embodiments are described and claimed.

19 Claims, 8 Drawing Sheets

(56) References Cited

U.S. PATENT DOCUMENTS

| | | | |
|---|---|---|---|
| 2015/0100712 A1* | 4/2015 | Sengoku | G06F 13/36 |
| | | | 710/110 |
| 2015/0199295 A1* | 7/2015 | Sengoku | G06F 13/364 |
| | | | 710/110 |
| 2017/0034284 A1 | 2/2017 | Smith et al. | |
| 2018/0004699 A1 | 1/2018 | Quiet et al. | |
| 2018/0052791 A1 | 2/2018 | Srivastava et al. | |
| 2018/0060272 A1* | 3/2018 | Mishra | G06F 13/102 |
| 2018/0157286 A1 | 6/2018 | Quiet et al. | |
| 2018/0293196 A1 | 10/2018 | Srivastava et al. | |
| 2018/0365188 A1 | 12/2018 | Srivastava | |
| 2018/0367504 A1 | 12/2018 | Srivastava | |
| 2019/0004991 A1 | 1/2019 | Foust et al. | |
| 2019/0033910 A1 | 1/2019 | Eder et al. | |
| 2019/0087377 A1 | 3/2019 | Srivastava et al. | |
| 2019/0155781 A1* | 5/2019 | Amarilio | G06F 13/362 |
| 2019/0171611 A1* | 6/2019 | Mishra | G06F 13/4291 |
| 2020/0073836 A1* | 3/2020 | Graif | G06F 1/3293 |

OTHER PUBLICATIONS

U.S. Appl. No. 16/221,962, filed Dec. 17, 2018, entitled "System, Apparatus and Method for Hardware-Based Bi-Directional Communication via Reliable High Performance Half-Duplex Link," by Amit Kumar Srivastava, et al.

European Patent Office, Search Report dated Oct. 28, 2020 in European patent application No. 20178716.5, 8 pages total.

MIPI Alliance, Amit Srivastava, "Specification for I3CSM, Version 1," Dec. 23, 2016, 198 pages.

\* cited by examiner

SYSTEM, APPARATUS AND METHOD FOR PEER-TO-PEER COMMUNICATION ON A MULTI-DROP INTERCONNECT

TECHNICAL FIELD

Embodiments relate to communication via multi-drop bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the MIPI Alliance, Inc. (www.mipi.org). This interface can be used to connect devices, such as internal or external sensors or so forth, to a host processor, applications processor or standalone device via a host controller or input/output controller. While a bus master capability can be transferred from one device to another device via a bus ownership transfer flow, there is considerable overhead and complexity that may make this operation difficult or ineffective in various situations.

DETAILED DESCRIPTION

In various embodiments, a slave device coupled to a multi-drop interconnect may be granted authorization by a master or bus owner to perform peer-to-peer communications with one or more other slave devices coupled to the interconnect. Understand that such peer-to-peer communications may occur without the need for the initiating slave device to seek an ownership transfer for the interconnect. Instead the slave device may seek authorization for a limited capability of performing peer-to-peer transactions, including driving a clock signal on the interconnect during such communications. But this limited capability does not include granting the slave device bus ownership, or allowing the slave device to handle other bus control issues. In this way, the complexity involved in a negotiation for ownership transfer is avoided, enabling efficient peer-to-peer communications with reduced overhead.

Some embodiments may be used in connection with intra-device communications on an I3C bus. Such transactions may occur without the need for a bus master to be involved in the communications, such as by way of identifying destination device and performing clock management during such transactions. Furthermore, by enabling an initiating slave device to drive the clock signal, improved signal integrity is realized, as both data and clock may issue from the same source, avoiding skew or other signal integrity issues. While embodiments may be used in many different circumstances, example implementations may be used for performing management component transport protocol (MCTP) transactions between various components. As such, embodiments may be used on a transaction-by-transaction basis to enable a single or limited amount of peer-to-peer communications to occur without incurring the overhead of a bus ownership transfer process.

Figure 1:
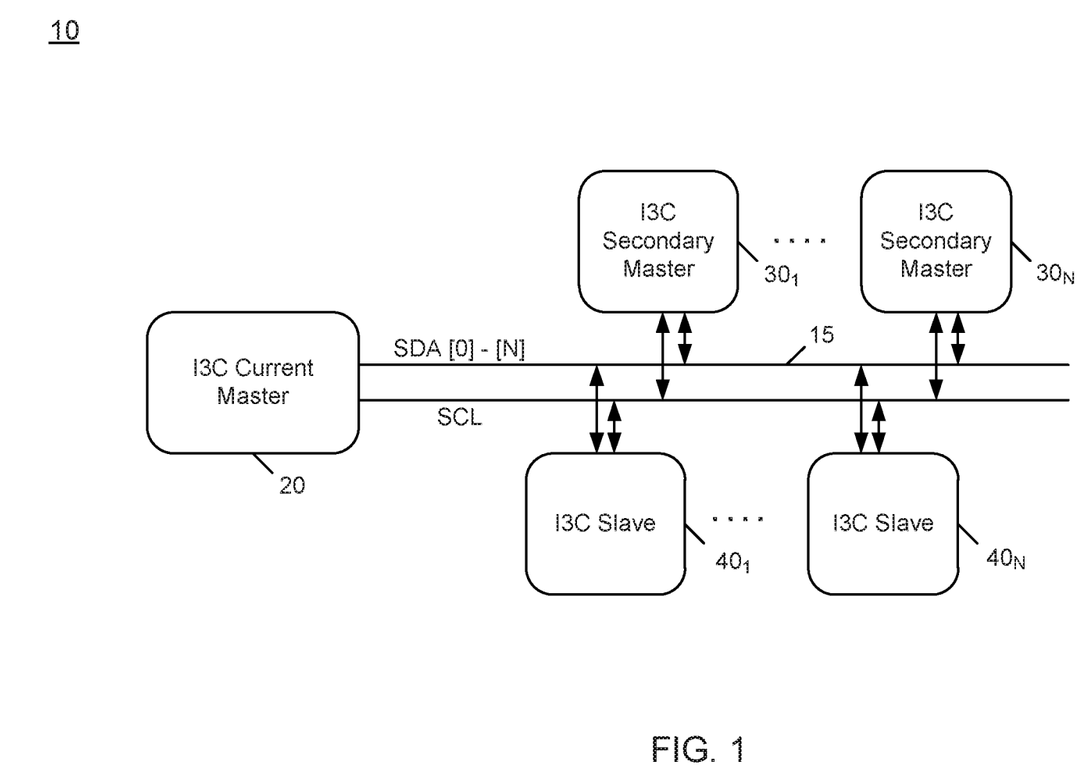
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15, which may take the form of any medium of communication including printed circuit board, flex cable or other communication media. In embodiments herein, bus 15 may be implemented as an I3C bus in accordance with an I3C specification, available from the MIPI Alliance, Inc., Inter-Integrated Circuit ($I^2C$) bus according to an $I^2C$ specification available from NXP Semiconductors or another half duplex communication interconnect that may be implemented with a minimal set of wires (e.g., two). Understand that as used herein, the term "IxC" is intended to refer to any and all variations of half-duplex links that may implement an embodiment, such as $I^2C$ or I3C interconnects. However, understand the scope of the present invention is not limited in this regard and in other embodiments, bus 15 may be implemented as any type of multi-drop interconnect.

As illustrated, a current master device 20 couples to bus 15. While in some cases, current master device 20 may be a primary master, for purposes of discussion herein, any bus master-capable device may be the current master. In various embodiments, master device 20 may be implemented as a host controller that includes hardware logic to act as a bus master for bus 15. Master device 20 may include a controller (not shown in the high level view of FIG. 1) to control data (SDA[0]-[n]) and clock (SCL), as well as use (e.g.,) internal current sources or passive pullups to hold bus 15 when all coupled devices are powered off. In some cases, master device 20 may be a relatively simple host controller for a low complexity bus or other multi-drop bus, such as in accordance with an $I^2C$ or I3C specification. Other multi-drop interfaces such as Serial Peripheral Interface and/or Microwire also may be present in a particular embodiment. While in FIG. 1, bus 15 has multiple data lines, embodiments may also be used in connection with a bus having a single data line and a single clock line.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as dedicated hardware logic, e.g., a programmable logic, to perform bus master activities for bus 15.

Note that bus 15 is implemented as a multi-wire bus in which one or more serial lines form a data interconnect and a single serial line forms a clock interconnect. As such, in the general case data communications can occur, e.g., in bidirectional manner between masters and slaves and clock communication can occur from master to slaves. Master device 20 may be a relatively compute complex device (as compared to other devices on bus 15) that consumes higher power than other devices coupled to bus 15.

As shown in FIG. 1, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20 known as a secondary master). One or more such secondary master devices 30 may be controlled to act as bus master for bus 15 while master device 20 is in a low power state, to enable bus operations to continue to proceed while in this low power state, based on a role definition in which as current master it drives a clock signal. Only one master can be the active master at a time. When one is the master, the others are acting as slaves.

As further illustrated in FIG. 1, a plurality of slave devices $40_1$-$40_N$ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices or so forth. In embodiments, at least certain slave devices 40 may be configured to operate in a peer-to-peer (P2P) communication mode in which a given slave device 40 can receive P2P communication permission from master device 20 to issue P2P transactions to one or more other slave devices 40 (and/or one or more secondary master devices 30). Such P2P transactions may be used to effect intra-device transactions in certain implementations. In these instances, the initiating slave device 40 may be configured with, at least, clock control circuitry such that it may generate and provide the clock signal during such P2P communications. Understand that such P2P communications do not incur the overhead and complexity of a bus master role transfer. Instead, the slave device is simply granted permission by master device 20 to perform one or more P2P communications in which it provides the clock signal, while master device 20 maintains the bus master role. And such slave devices 40 having capability for P2P communications may implement limited additional functionality as compared to secondary master devices 30. Understand while shown at this high level in the embodiment of FIG. 1, many variations and alternatives are possible.

Figure 2:
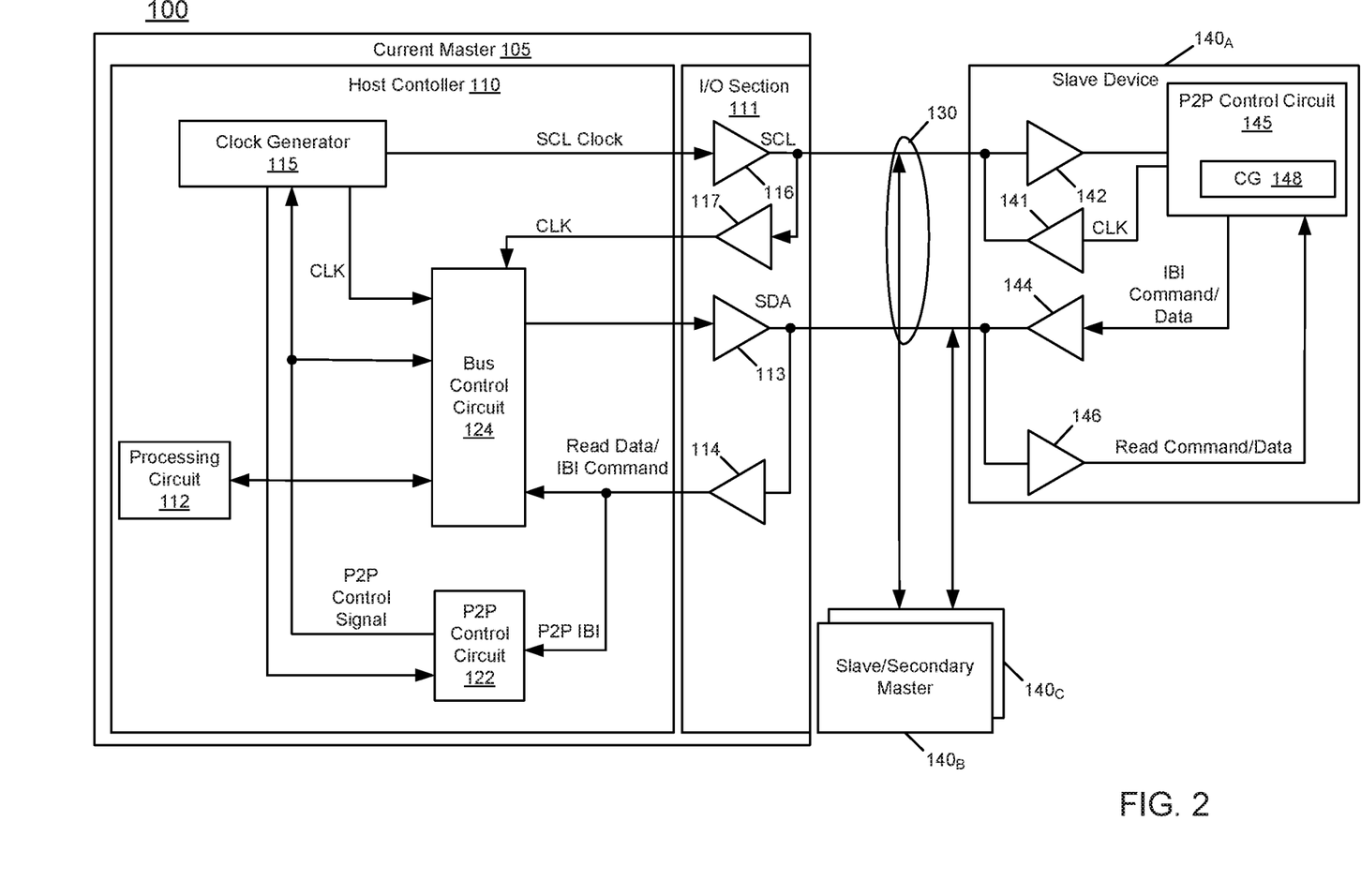
FIG. 2 is a block diagram of a system in accordance with another embodiment of the present invention.

Referring now to FIG. 2, shown is a block diagram of a system in accordance with an embodiment of the present invention. As shown in FIG. 2, a portion of a system 100 includes a current master 105 including a host controller 110 coupled to a plurality of devices $140_A$-$140_C$ via a multi-drop bus 130. As further illustrated, current master 105 includes an input/output (I/O) section 111. Devices 140 (also referred to herein as "slaves") may have different operational characteristics and also may have different capabilities of being added/removed from bus 130. As will be described herein, host controller 110 may be configured as a bus master, in at least certain operational phases. For ease of illustration, bus 130 is implemented as a two-wire bus in which a single serial line forms a data interconnect and another single serial line forms a clock interconnect. However in other implementations, there may be multiple data lines. Data communications can occur in bi-directional manner and clock communications can occur in a unidirectional manner. Understand that for granted P2P communications, the clock signal may be sent instead from a given slave device 140 and not from bus master 110 for such transactions.

At the high level illustrated in FIG. 2, assume that different types of devices 140 are present. Devices $140_{A-C}$ have, inter alia, different physical placements and electrical performance. For example, device $140_A$ may be always powered on and present as being coupled to bus 130. As an example, device $140_A$ may be a given type of sensor, such as an accelerometer or other sensor which may be incorporated in a given system (such as a smartphone or other mobile platform). In some implementations, device $140_A$ may have debug capabilities and may seek to communicate debug information with one or more other slave devices 140.

As illustrated in FIG. 2, device $140_A$ may include a peer-to-peer (P2P) control circuit 145. In embodiments, control circuit 145 may be configured to issue a P2P communication request to current master 105. When granted such permission, control circuit 145 then may send one or more P2P communications to other slave devices 140. In addition, control circuit 145 in such mode may also transmit a clock signal (generated within a clock generator 148) via the clock line of bus 130. As illustrated, clock generator 148 may output the clock signal via a driver 141 onto bus 130. Otherwise during normal bus communications, slave device $140_A$ may receive the clock signal in a receiver 142 via the clock line of bus 130. Data communications in input and output directions may be handled via corresponding receiver 146 and driver 144.

For issuing a P2P communication requests, control circuit 145 may generate an in-band interrupt (IBI) command having a predetermined mandatory data byte (MDB) value to request permission from current master 105. Note that in various implementations, device $140_A$ may not have full bus mastering capabilities, such that the device is not capable of operating as a bus master or secondary master. Yet with P2P control circuit 145, slave device $140_A$ may be granted the limited ability to issue P2P transactions to one or more other slave devices 140, including driving of a clock signal as described herein.

Device $140_B$ may be powered when it is to be active. As an example, assume that device $140_E$ is another type of sensor, such as a camera device. In such example, device $140_E$ may be powered on only when a camera functionality of the system is active. In other cases device $140_E$ may be a slave device that can be physically added/removed via a hot plug or hot unplug operation, such as a cable, card, or external peripheral device that is coupled to bus 130, e.g., by a cable, external connection or so forth. In still other cases, device $140_E$ may be coupled via an in-box cable. In such cases, there may be a long distance between device $140_E$ and host controller 110. In some implementations, device $140_E$ may be relatively further away from host controller 110 than device $140_A$.

In the embodiment of FIG. 2 slave device $140_E$ may be implemented as a secondary master such that in certain circumstances such as where current master 105 is to be powered down to reduce power consumption, slave device $140_E$ may operate in the bus master role. Also shown in FIG. 2 is another slave device $140_C$, which may be any other type of slave device either without secondary master capabilities, and further may include P2P capabilities as described herein. Note that a recipient of a P2P communication may be unaware that the initiating slave device is driving the clock signal; instead such communication appears to the receiving device as any other transaction (albeit with the advantage of improved signal integrity given the common source of clock and data). Stated another way, the P2P responsibility granted to an initiating slave device is transparent to receiving slave devices. And with an embodiment as in FIG. 2, it is possible for master device 105 to act as a slave device and participate in P2P communications when one of devices $140_{B,C}$ are current master.

As illustrated in FIG. 2, host controller 110 includes a processing circuit 112. Understand that many different types of host controllers can be provided. As examples, host controller 110 may be an interface circuit of a multicore processor or other SoC, application processor or so forth. In other cases, host controller 110 may be a standalone host controller for bus 130. And of course other implementations are possible. In a debug context, processing circuit 112 may be a debug controller or aggregator to aggregate information received from other debug sources such as may be present in one or more of devices 140. In different implementations, processing circuit 112 may represent one or more cores or other hardware processing logic of a particular device or it may simply be part of an interface circuit to act as transmitter and receiver for host controller 110.

In turn, processing circuit 112 couples, via a bus control circuit 124, to a driver 113 that drives data onto bus 130 and a receiver 114 that receives incoming data from bus 130. Bus control circuit 124 may be configured to handle bus mastering operations for bus 130 and further may be configured to delegate bus mastering role to one or more slave devices 140 having secondary master capabilities.

Host controller 110 further includes a clock generator 115 to provide a clock signal (and/or to receive a clock signal, in implementations for certain buses) to a clock line of bus 130 via corresponding driver 116. In various embodiments, clock generator 115 may be configured to provide additional clock signals for use in host controller 110, as described herein.

As further illustrated, current master 105 further includes a P2P control circuit 122. In various embodiments, control circuit 122 may, in response to receipt of an IBI or other P2P communication request from a given slave device 140, determine whether to grant P2P communication responsibility to such slave device 140. Assuming P2P control circuit 122 determines that such delegation is allowed, it may cause communication of an acknowledgement message back to the requesting slave device (via bus control circuit 124 and driver 113). Still further, P2P control circuit 122 may issue a P2P control signal to clock generator 115, which causes it to stop driving the SCL clock onto bus 130, by disabling driver 116. Similarly, after communication of the acknowledgment message, bus control circuit 124 may cause driver 113 to be disabled. In this arrangement, host controller 110 may receive the clock signal via receiver 117.

Figure 3:
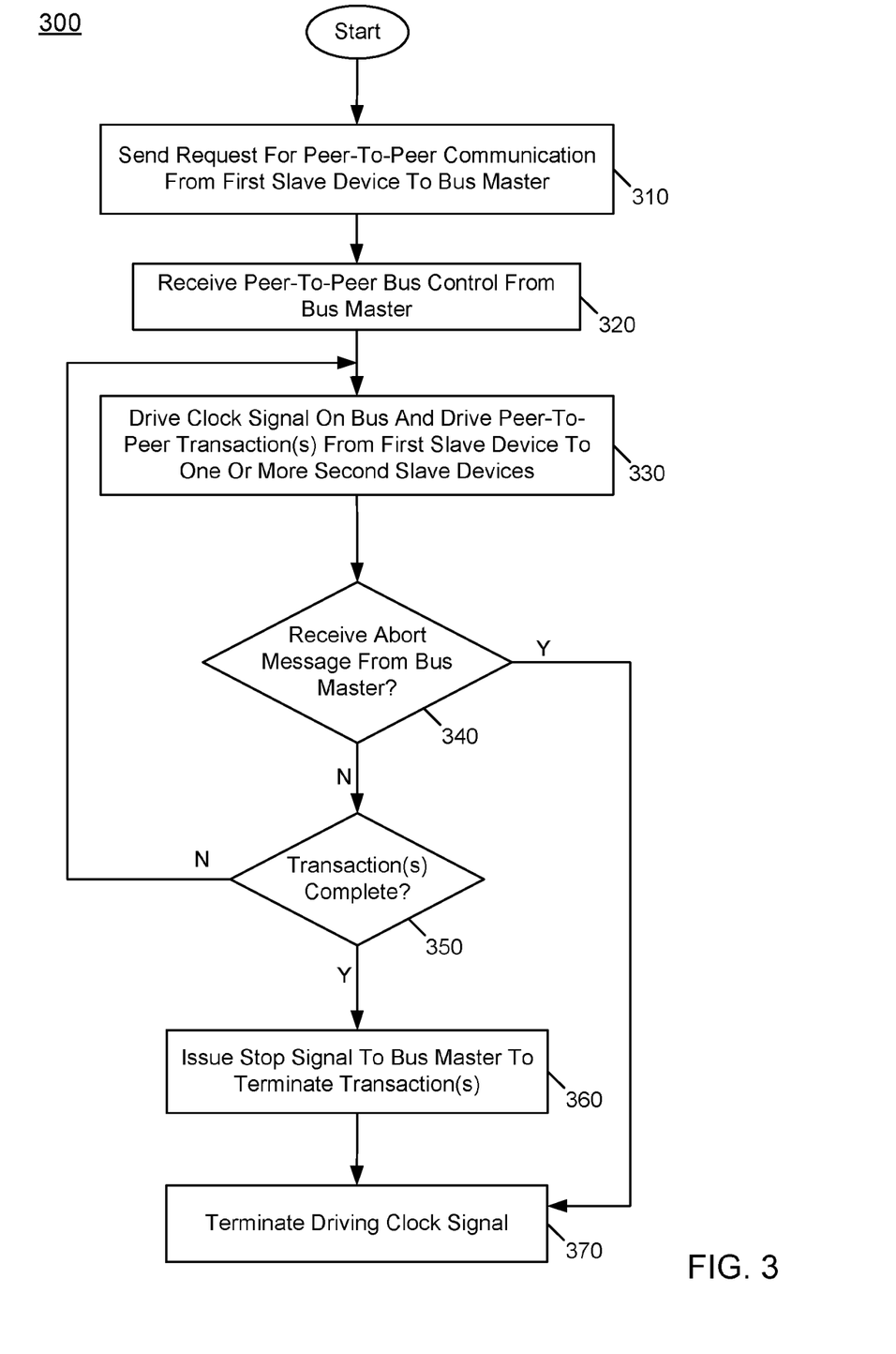
FIG. 3 is a flow diagram of a method in accordance with an embodiment of the present invention.

Referring now to FIG. 3, shown is a flow diagram of a method in accordance with an embodiment of the present invention. More specifically, method 300 is a method for performing peer-to-peer communication between slave devices. In FIG. 3, method 300 may be performed by a slave device seeking permission from a bus master to perform at least one peer-to-peer transaction. As such, method 300 may be performed by hardware circuitry, firmware, software and/or combinations thereof, such as may be present in a given slave device.

As seen, method 300 begins by sending a request for peer-to-peer communication from the first slave device to the bus master (block 310). Although the scope of the present invention is not limited in this regard, in one embodiment this peer-to-peer communication request may be issued as an in-band interrupt having a predetermined value in its mandatory data byte to identify the interrupt as a P2P request. Assuming the bus master grants the request, control next passes to block 320 where the slave device receives peer-to-peer bus control from the bus master. To this end, the bus master may send an acknowledgment message and further may park clock and data lines of the bus so that they can be driven by the first slave device.

As further shown in FIG. 3, at block 330 the first slave device may drive a clock signal on a clock line of the bus and further may drive a peer-to-peer transaction to one or more second slave devices on a data line of the bus. In different embodiments, this P2P transaction may be a unicast message directed to a single other slave device or a multicast or broadcast message directed to multiple other slave devices. In any case, while sending the transaction (and possibly additional P2P transactions) and driving the clock signal for the bus, it may be determined whether an abort message is received from the bus master (diamond 340). In one embodiment, the abort message may take the form of a T-bit received from the bus master. If such abort message is received, control passes from diamond 340 to block 370 where the first slave device may terminate driving the clock signal, as it has lost its P2P transaction capability.

Otherwise if no abort message is received, the first slave device may determine whether one or more transactions are completed, at diamond 350. If not, control passes back to block 330 for further driving of the clock signal and issuing P2P transactions to one or more slave devices. Instead if it is determined at diamond 350 that the slave device has completed its P2P transactions, control passes to block 360 where the slave device issues a stop signal to the bus master. This stop signal is an indication to the bus master that the slave device has completed its transactions and that the bus master may again begin driving the clock signal. From block 360 control passes to block 370 where the slave device terminates driving the clock signal. Although shown at this high level in the embodiment of FIG. 3, many variations and alternatives are possible.

Figure 4:
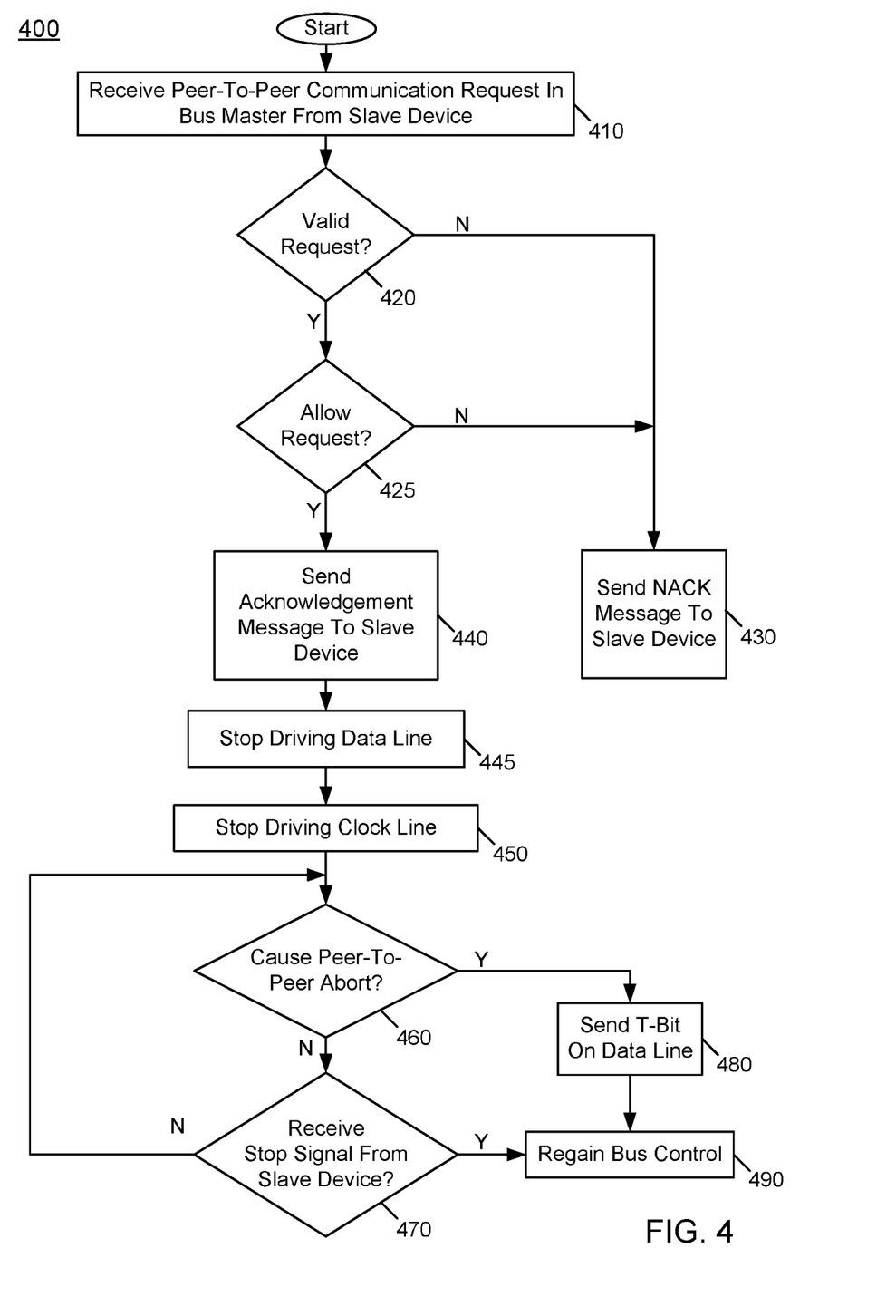
FIG. 4 is a flow diagram of a method in accordance with another embodiment of the present invention.

Referring now to FIG. 4, shown is a flow diagram of a method in accordance with an embodiment of the present invention. More specifically, method 400 is a method for performing peer-to-peer communication between slave devices. In FIG. 4, method 400 may be performed by a master device that receives a request from a slave device seeking permission to perform at least one peer-to-peer transaction. As such, method 400 may be performed by hardware circuitry, firmware, software and/or combinations thereof, such as may be present in a given master device.

As shown in FIG. 4, method 400 begins by receiving a peer-to-peer communication request from a slave device in the bus master (block 410). Next it is determined whether this request is valid (diamond 420). For example, the bus master may confirm that the received request, which may be in the form of an in-band interrupt, includes an MDB having the appropriate predetermined value. If not, control passes to block 430 where the bus master sends a NACK message to the slave device. Thus in this instance, the bus master does not grant any P2P transaction permission to the slave device and the bus master continues to drive the clock signal as appropriate.

Still with reference to FIG. 4, if it is determined that request is valid, control passes to diamond 425 where it is determined whether to allow the request. As examples, the bus master may determine whether to grant the request based on a variety of factors, including current bus activities, pending bus master role transfers, bus power transitions and so forth. If the request is not allowed, control passes to block 430, discussed above.

Assuming that the bus master allows the P2P communication request to be granted, control passes to block 440 where the bus master sends an acknowledgment message to the slave device, to indicate that the slave device is allowed to perform one or more P2P transactions. In this instance, the bus master may stop driving data and clock lines (blocks 445 and 450).

At this point, the bus master has granted limited bus control to the slave device to issue one or more P2P transactions. However, understand that it is possible for the bus master to cause these transactions to terminate early. Thus it may be determined at diamond 460 whether peer-to-peer transactions are to be aborted. This determination may be based on higher priority messages to be delivered by the bus master, or for other reasons such as detection of an error condition or so forth. If it is determined to cause P2P transactions to be aborted, control passes to block 480 where the bus master may send a T-bit on a data line as a signal to the slave device to cause it to stop its P2P transaction. As such, control passes to block 490 where the bus master may regain bus control. Note that the slave device may perform clean up operations in this situation. For example the slave device may keep track of the fact that it did not complete its transaction, and may retry at a later time. To this end, the slave device may start a timer to countdown to when it will retry.

Otherwise, if there is no reason to abort the P2P transactions, control passes next to diamond 470 to determine whether the bus master has received a stop signal from the slave device, which is an indication that the slave device has completed its P2P transactions. If so, control passes to block 490 where the bus master may regain bus control, including to begin driving the clock signal on the bus, as appropriate. If the slave device is still performing a P2P transaction, control instead loops back to diamond 460. Understand while shown at this high level in the embodiment of FIG. 4, many variations and alternatives are possible.

Figure 5:
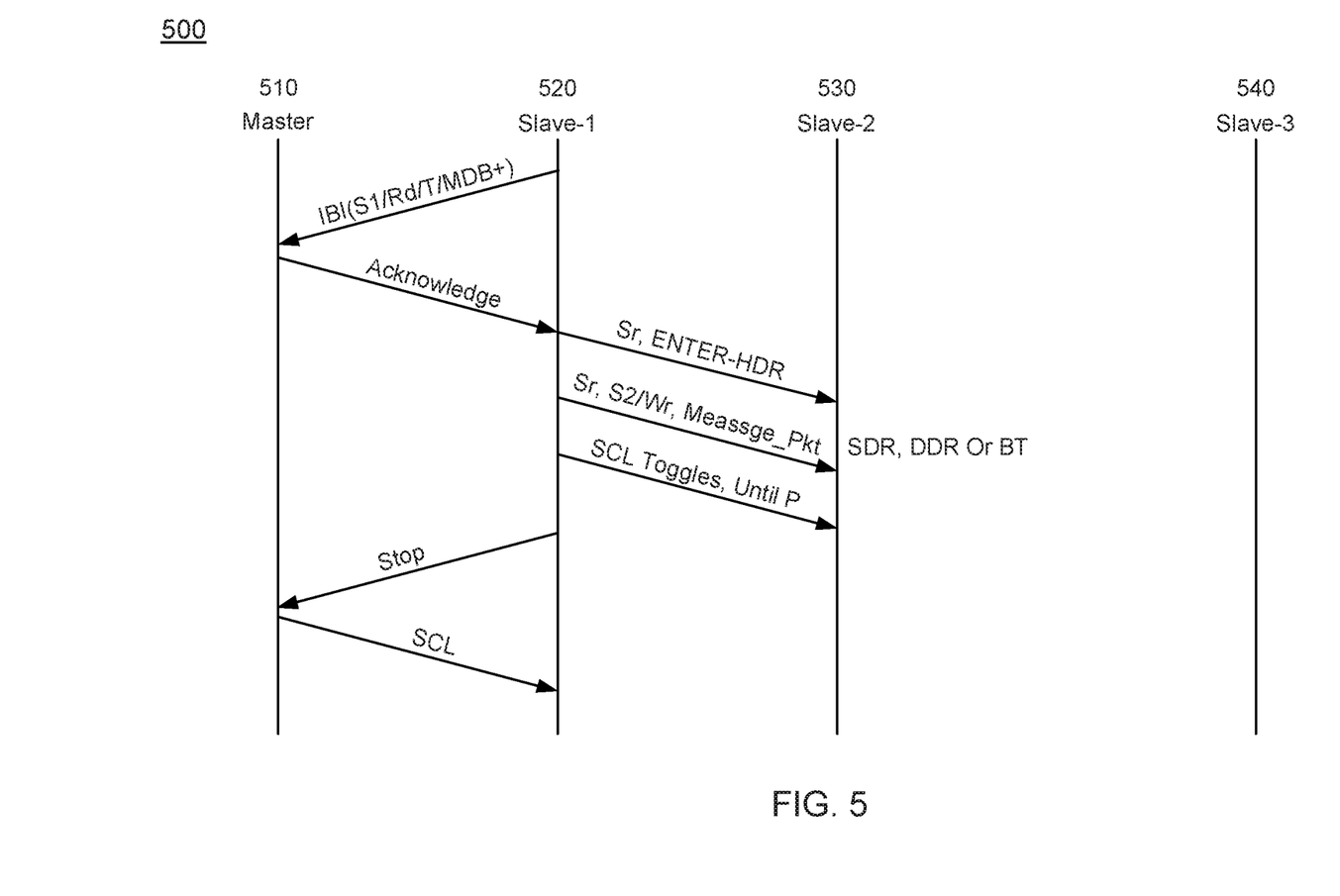
FIG. 5 is a timing diagram illustrating a peer-to-peer communication flow in accordance with an embodiment of the present invention.

Referring now to FIG. 5, shown is a timing diagram illustrating a peer-to-peer communication flow in accordance with an embodiment of the present invention. In FIG. 5, a computing platform 500, which may be any type of system includes multiple devices coupled via a multi-drop bus. As shown in FIG. 5, assume the multi-drop bus has a master device 510 coupled to it, along with multiple slave devices, namely a first slave device 520, a second slave device 530 and a third slave device 540.

In the timing diagram of FIG. 5, first slave device 520 seeks permission for a P2P transaction by sending an IBI with a mandatory data byte having a predetermined value, namely a magic value to indicate the request. Thereafter, first slave device 520 may follow the mandatory data byte with T=0, to indicate that the current request is complete.

When master device 510 identifies the request as a P2P request by way of the MDB matching the magic value, it may determine whether to authorize the communication. As an example, the master may depending on either a private contract with slave devices or as determined by the MDB and its value to not hand over control for this transaction and abort it, e.g., by issuing a stop command on the bus. Note that in some embodiments, the magic value may have a size larger than a single byte to allow additional usage types. In some cases, this magic value may be followed by a logical address to identify the receiving slave device. If such logical device is on another physical link, the master device may insert its own address to bridge the P2P communication to the correct link. In other cases, the magic value may be followed by a physical address that the master device may consider in determining whether to allow the peer-to-peer communication. Still further in some cases the magic value may be followed by additional code words to determine specific actions to be taken by the master device before bus handover occurs. Note that in different embodiments, the magic value may be provided to slave devices capable of P2P communications with a common command code (CCC) or as a fixed constant.

Assuming that master device 510 determines to allow the P2P communication to occur, it may back off to relinquish bus control, e.g., by parking the bus or otherwise stopping driving signaling on the bus to the requesting slave until a stop signal is received. In one embodiment, this back off and bus relinquishment may be realized by the master parking a data line of the bus and thereafter parking a clock line of the bus, such as placing both lines to a high logic state, e.g., by tri-stating the data and clock lines, to enable first slave device 520 to start the P2P transaction with a restart. This transfer of temporary (and limited) bus control occurs with minimal hardware bus handover overhead and no software bus handover overhead. Note that this authorization is a temporary grant of bus ownership until a stop signal is received in master device 510 from first slave device 520, or until master device 510 issues an abort command. Thus this bus ownership transfer is of a time limited and temporary duration.

Still with reference to FIG. 5, first slave device 520, after being granted this temporary bus ownership by way of the acknowledgement message, may initiate the transaction with a repeated start communication. Note that prior to the actual transaction communication, first slave device 520 may perform a mode change such as using an enter high speed mode command (ENTHDR CCC) after issuing a repeated start to enable HDR modes including bulk transfers. For example, one or more MCTP packets may be sent during this bulk transfer in a high speed mode.

As further illustrated further in FIG. 5, after entry into this HDR mode, first slave device 520 may issue one or more write commands with message packets to second slave device 530, while driving the clock signal until it issues a stop signal back to master device 510. At this point, master device 510 may begin to again drive the clock signal, and may initiate further communications after an idle/available time period. Understand that FIG. 5 is in the context of an IC3 bus; however embodiments are applicable to other communication protocols. Also understand that in the case of a multi-data line bus, for purposes of the IBI phase additional data lines (e.g., SDA[1]-[n]) are not used until first slave device 520 receives permission from master device 510 to start driving a P2P transaction on the bus. For SDR mode, a multi-lane transaction may happen immediately after the repeated start. For HDR modes, a multi-lane transaction may use an ENTHDRx CCC after the repeated start. In both cases, second slave device 530 may be configured to accept transactions in a supported multi-lane mode (by master device 510).

With embodiments, an efficient peer-to-peer mechanism is provided in which a slave device can initiate transactions, after a minimal handover process with a bus master. Such mechanism may be particularly appropriate where the overhead of a full bus handover to a secondary master would outweigh the benefit for short (e.g., time-limited duration) P2P transactions.

Figure 6:
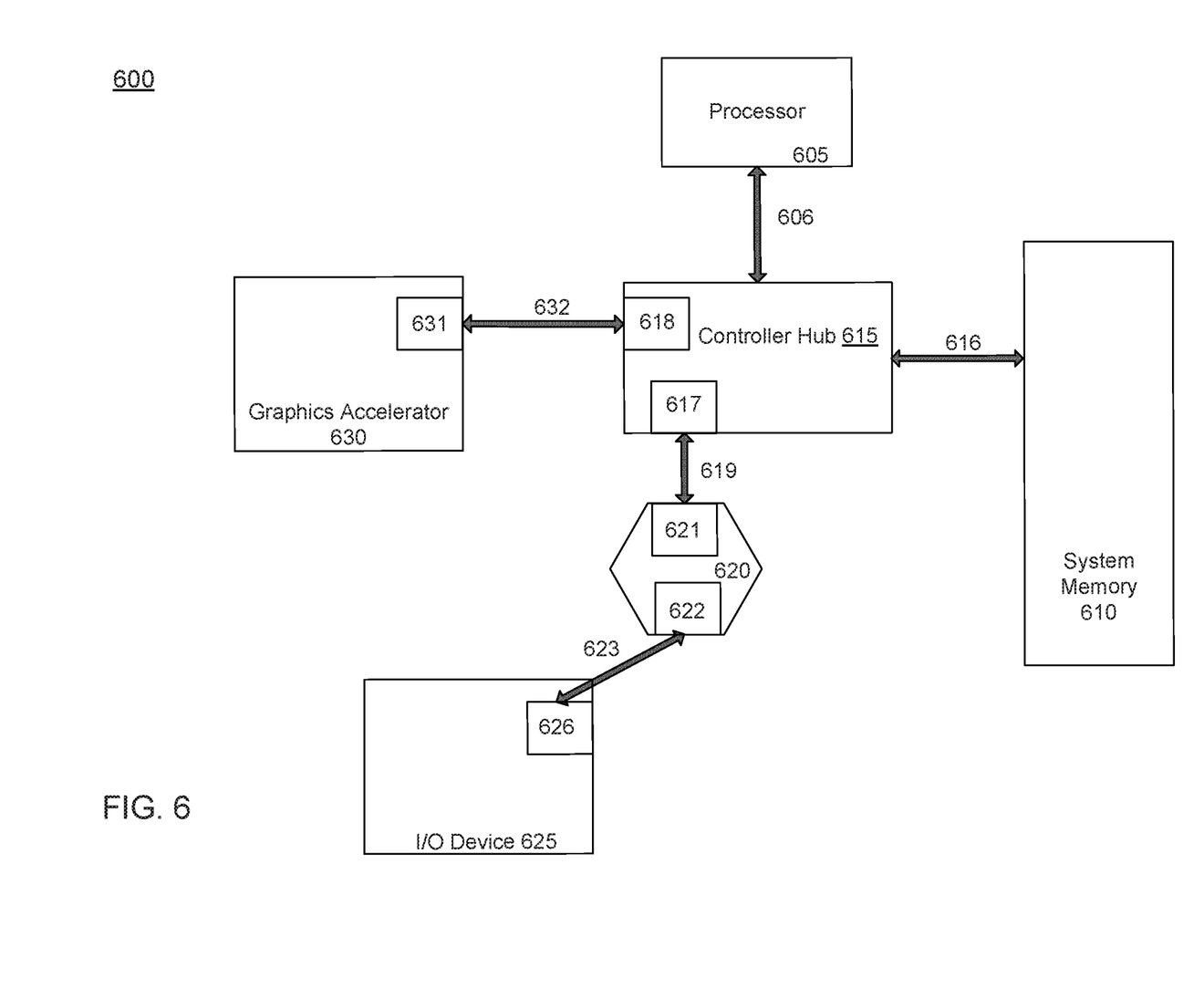
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a parallel serial, differential interconnect architecture that is compliant with different interconnect standards, and which may couple with one or more masters to control peer-to-peer communications on a bus as described herein.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
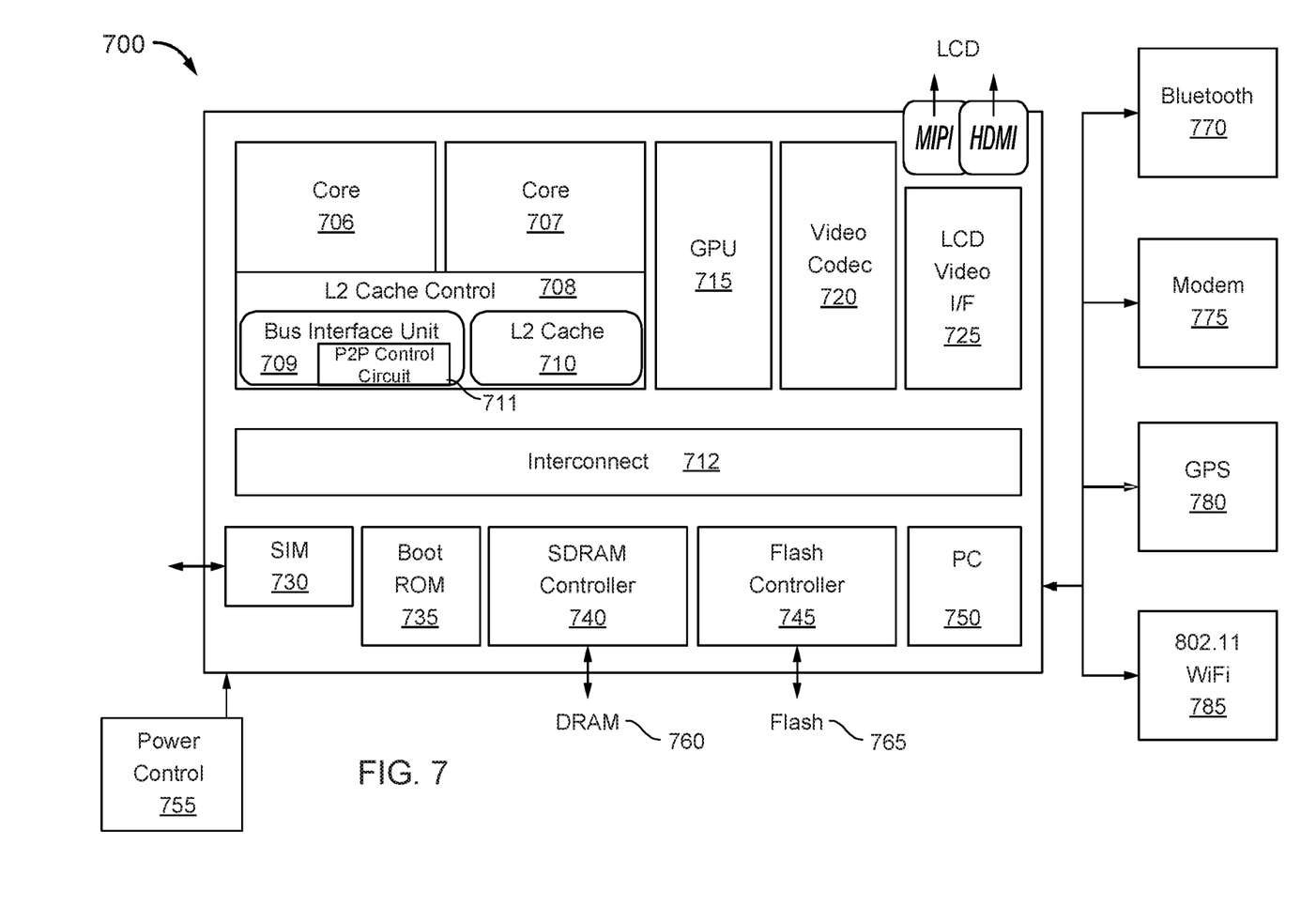
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712. In the embodiment shown, bus interface unit 709 includes a P2P control circuit 711, which may be configured to enable P2P communications as described herein.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including control of intra-device communications. In addition, the system illustrates peripherals for communication, such as a Bluetooth module 770, 3G modem 775, GPS 780, and WiFi 785. Also included in the system is a power controller 755.

Figure 8:
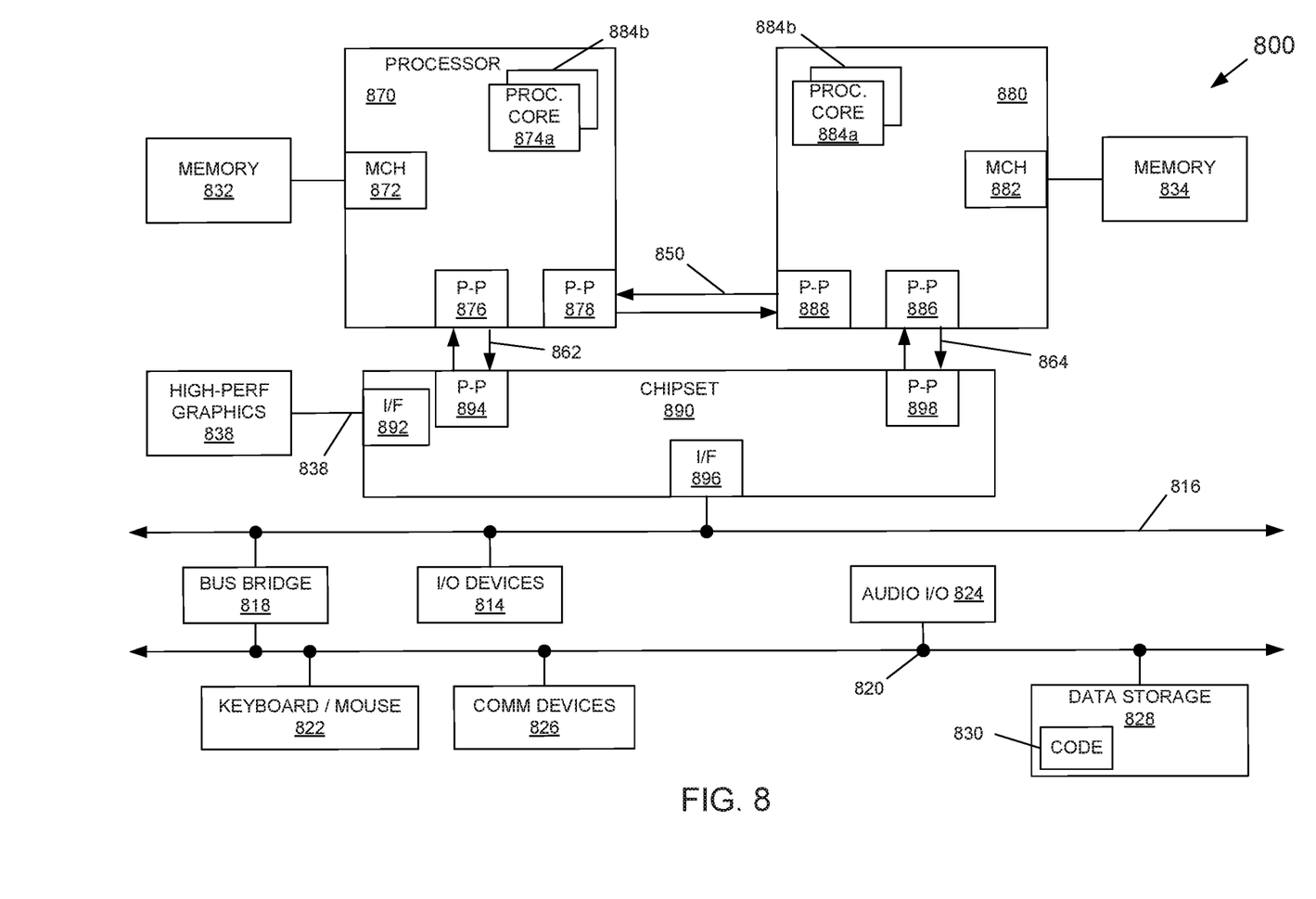
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 8 may be configured to control intra-device communications between non-master devices in which one of the devices drives a clock signal for one or more of the interconnect structures, as described herein.

The following examples pertain to further embodiments.

In one example, an apparatus includes: a first receiver to receive a clock signal from a multi-drop interconnect; a second receiver to receive a data signal from the multi-drop interconnect; a P2P control circuit to issue a P2P communication request to a bus master of the multi-drop interconnect to request authorization to send a P2P transaction to at least one slave device coupled to the multi-drop interconnect; a first transmitter to transmit the P2P transaction to the at least one slave device when the bus master grants the authorization for the P2P transaction; and a second transmitter to output the clock signal to the multi-drop interconnect during the P2P transaction.

In an example, the apparatus further comprises a clock generator to generate the clock signal.

In an example, the apparatus comprises a first slave device not having bus mastering capability.

In an example, the P2P control circuit is to issue the P2P communication request as an in-band interrupt having a predetermined mandatory data byte value to indicate the P2P communication request.

In an example, after the P2P transaction, the P2P control circuit is to issue a stop signal to the bus master to cause the bus master to drive the clock signal to the multi-drop interconnect.

In an example, after the P2P transaction, the second transmitter is to stop driving the clock signal.

In an example, the P2P transaction comprises a multicast message to be sent to at least two slave devices.

In an example, during the P2P transaction, the second transmitter is to output the clock signal without a bus master role transfer.

In another example, a method comprises: sending, from a first slave device, a request for a P2P communication to a bus master coupled to the first slave device via a multi-drop interconnect; receiving, in the first slave device, an authorization from the bus master to perform the P2P communication; and in response to the authorization, driving a clock signal on the multi-drop interconnect and issuing at least one P2P transaction to one or more second slave devices coupled to the multi-drop interconnect.

In an example, the method further comprises after the at least one P2P transaction, sending a stop signal to the bus master to cause the bus master to re-initiate driving the clock signal on the multi-drop interconnect.

In an example, sending the request comprises sending an in-band interrupt from the first slave device to the bus master, the in-band interrupt having a predetermined mandatory data byte to indicate the request for the P2P communication.

In an example, receiving the authorization comprises receiving an acknowledgement message from the bus master in response to the in-band interrupt.

In an example, the method further comprises: driving the clock signal after the bus master stops driving a clock line of the multi-drop interconnect; and issuing the at least one P2P transaction after the bus master stops driving a data line of the multi-drop interconnect.

In an example, the method further comprises: issuing a first P2P transaction to a first second slave device; and issuing a second P2P transaction to a plurality of second slave devices.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system includes: a bus master device having bus master responsibility for a multi-drop bus, wherein the bus master device is to drive a clock signal on a clock line of the multi-drop bus; a first slave device coupled to the bus master device via the multi-drop bus, and a second slave device coupled to the first slave device via the multi-drop bus. The first slave device may include: a P2P control circuit to issue a P2P communication request to the bus master device to request authorization to send a P2P transaction to the second slave device; a first transmitter to transmit the P2P transaction to the second slave device when the bus master device grants the authorization for the P2P transaction; and a second transmitter to drive the clock signal on the clock line of the multi-drop bus during the P2P transaction.

In an example, the bus master device is to retain the bus master responsibility during the P2P transaction.

In an example, the P2P control circuit is to issue the P2P communication request as an in-band interrupt having a predetermined mandatory data byte value to indicate the P2P communication request, and the bus master device is to grant the authorization for the P2P transaction to the first slave device based at least in part on the predetermined mandatory data byte value.

In an example, the bus master device is to send an abort signal, and in response to the abort signal, the first slave device is to terminate the P2P transaction and stop driving the clock signal on the clock line of the multi-drop bus.

In an example, after the P2P transaction, the P2P control circuit is to issue a stop signal to the bus master device to cause the bus master device to drive the clock signal on the clock line of the multi-drop bus.

In an example, the second slave device comprises a secondary bus master control circuit to receive the bus master responsibility from the bus master device.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a first receiver to receive a clock signal from a multi-drop interconnect, the multi-drop interconnect comprising an I3C bus;
    a second receiver to receive a data signal from the multi-drop interconnect;
    a peer-to-peer (P2P) control circuit to issue a P2P communication request to a bus master of the multi-drop interconnect to request authorization to send a P2P transaction to at least one slave device coupled to the multi-drop interconnect, while the bus master retains ownership of the multi-drop interconnect during the P2P transaction;
    a first transmitter to transmit the P2P transaction to the at least one slave device on a data line of the multi-drop interconnect, when the bus master grants the authorization for the P2P transaction; and
    a second transmitter to drive only the clock signal on a clock line of the multi-drop interconnect during the P2P transaction, when the bus master grants the authorization for the P2P transaction.

2. The apparatus of claim 1, wherein the apparatus further comprises a clock generator to generate the clock signal.

3. The apparatus of claim 2, the apparatus a first slave device not having bus mastering capability.

4. The apparatus of claim 1, wherein the P2P control circuit is to issue the P2P communication request on the data line as an in-band interrupt having a predetermined mandatory data byte value to indicate the P2P communication request.

5. The apparatus of claim 1, wherein after the P2P transaction, the P2P control circuit is to issue a stop signal to the bus master to cause the bus master to drive the clock signal to the multi-drop interconnect.

6. The apparatus of claim 5, wherein after the P2P transaction, the second transmitter is to stop driving the clock signal.

7. The apparatus of claim 1, wherein the P2P transaction comprises a multicast message to be sent to at least two slave devices.

8. The apparatus of claim 1, wherein during the P2P transaction, the second transmitter is to drive the clock signal on the clock line without a bus master role transfer, after the bus master parks the clock signal.

9. A non-transitory machine-readable medium having stored thereon instructions, which if performed by a machine cause the machine to perform a method comprising:
    sending, from a first slave device, a request for a peer-to-peer (P2P) communication to a bus master coupled to the first slave device via a multi-drop interconnect;
    receiving, in the first slave device, an authorization from the bus master to perform the P2P communication; and
    in response to the authorization, driving, via the first slave device, a clock signal only on a clock line of the multi-drop interconnect and issuing at least one P2P transaction from the first slave device to one or more second slave devices coupled to the multi-drop interconnect while the bus master retains ownership of the multi-drop interconnect during the at least one P2P transaction.

10. The non-transitory machine-readable medium of claim 9, wherein the method further comprises after the at least one P2P transaction, sending a stop signal to the bus master to cause the bus master to re-initiate driving the clock signal on the multi-drop interconnect.

11. The non-transitory machine-readable medium of claim 9, wherein sending the request comprises sending an in-band interrupt from the first slave device to the bus master on a data line of the multi-drop interconnect, the in-band interrupt having a predetermined mandatory data byte to indicate the request for the P2P communication.

12. The non-transitory machine-readable medium of claim 11, wherein receiving the authorization comprises receiving an acknowledgement message from the bus master in response to the in-band interrupt, wherein the bus master is further to park the clock line and the data line.

13. The non-transitory machine-readable medium of claim 9, wherein the method further comprises:
    driving the clock signal after the bus master stops driving the clock line of the multi-drop interconnect; and
    issuing the at least one P2P transaction after the bus master stops driving a data line of the multi-drop interconnect.

14. The non-transitory machine-readable medium of claim 9, wherein the method further comprises:
    issuing a first P2P transaction to a first second slave device; and
    issuing a second P2P transaction to a plurality of second slave devices.

15. A system comprising:
a bus master device having bus master responsibility for a multi-drop bus, wherein the bus master device is to drive a clock signal on a clock line of the multi-drop bus;
a first slave device coupled to the bus master device via the multi-drop bus, wherein the first slave device comprises:
 a peer-to-peer (P2P) control circuit to issue a P2P communication request to the bus master device on a data line of the multi-drop bus to request authorization to send a P2P transaction to a second slave device;
 a first transmitter to transmit the P2P transaction to the second slave device on the data line of the multi-drop bus, when the bus master device grants the authorization for the P2P transaction; and
 a second transmitter to drive the clock signal only on the clock line of the multi-drop bus during the P2P transaction, when the bus master device grants the authorization for the P2P transaction; and
the second slave device coupled to the first slave device via the multi-drop bus, wherein the bus master device is to retain ownership of the multi-drop bus during the P2P transaction.

16. The system of claim 15, wherein the P2P control circuit is to issue the P2P communication request as an in-band interrupt having a predetermined mandatory data byte value to indicate the P2P communication request, and the bus master device is to grant the authorization for the P2P transaction to the first slave device based at least in part on the predetermined mandatory data byte value.

17. The system of claim 15, wherein the bus master device is to send an abort signal, and in response to the abort signal, the first slave device is to terminate the P2P transaction and stop driving the clock signal on the clock line of the multi-drop bus.

18. The system of claim 15, wherein after the P2P transaction, the P2P control circuit is to issue a stop signal to the bus master device to cause the bus master device to drive the clock signal on the clock line of the multi-drop bus.

19. The system of claim 15, wherein the second slave device comprises a secondary bus master control circuit to receive the bus master responsibility from the bus master device.

* * * * *